Dec. 10, 1968

F. J. SANTANGELO 3,415,709

EDGE REINFORCED PANELING

Filed Aug. 2, 1965

INVENTOR.
FRANCIS J. SANTANGELO
BY
Arnold J. Worfolk
ATTORNEY

United States Patent Office 3,415,709
Patented Dec. 10, 1968

3,415,709
EDGE REINFORCED PANELING
Francis J. Santangelo, Middlesex, N.J., assignor to Johnson & Johnson, a corporation of New Jersey
Filed Aug. 2, 1965, Ser. No. 476,481
2 Claims. (Cl. 161—44)

ABSTRACT OF THE DISCLOSURE

A flexible panel including a fibrous base provided with a plastic surface coating and an edge recess extending through said coating into said base filled with a plastic material which extends along the marginal edges of said base providing edge reinforcing means therefor.

This invention relates to composite paneling of the type wherein plastic structural strengthening member sections are injection molded along marginal edges of flexible paneling to produce a composite in which the structural member sections act to preserve the contour of the paneling and the paneling acts to preserve the relationship of the structural member sections. More particularly it relates to such composite paneling in which the plastic material of the structural member section is adhesively incompatible with the material of which the paneling is made.

According to the present invention paneling of fibrous material coated with a first plastic is combined by injection molding with a structural member section of a second plastic adhesively incompatible with the first plastic, by forcing the second plastic under molding pressures through scoring in the plastic coating and into the fibrous material of which the paneling is made.

A better understanding of the invention may be had from the following description read in conjunction with the accompanying drawings wherein.

Figure 1:
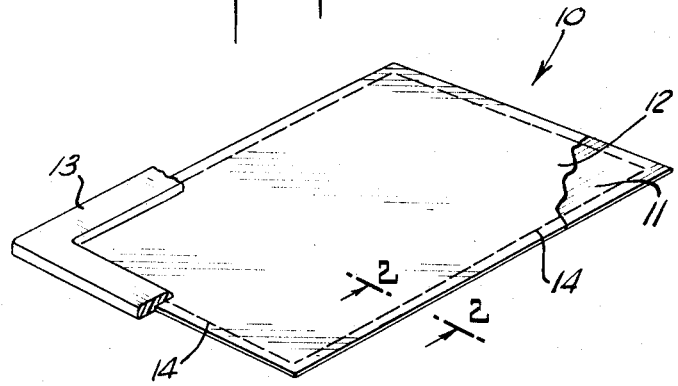
FIG. 1 is a perspective view of composite paneling of fibrous material having a surface coated with a first thermoplastic material and a fragmental section of a plastic structural member secured thereto.
Figure 2:
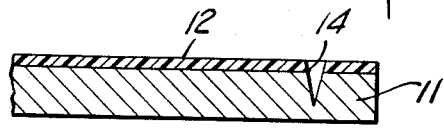
FIG. 2 is a fragmental sectional view on line 2—2 of FIG. 1.
Figure 3:
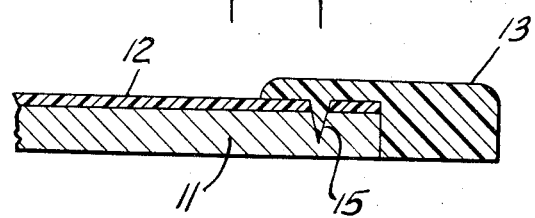
FIG. 3 is a fragmental sectional view similar to FIG. 2 but after a marginal plastic structural member section has been secured thereto by injection molding.

A panel 10 comprising a base sheet 11 of fibrous material and provided with a coating 12 of a first plastic material is prepared for the application thereto of a marginal structural member section 13 by impressing score marks 14 along the panel near its edges. The score marks penetrate the plastic coating and give access to the fibrous interior of the base sheet.

The panel is inserted into a mold (not shown) but which presents a mold cavity of appropriate shape to provide a structural plastic member section of desired cross section and which extends along the edges of the panel to the extent that structural plastic member sections along the panel margins are desired.

The score marks 14 are disposed within the mold cavity. Accordingly, thermoplastic material injected under pressure into the mold to produce the structural plastic member 13 will pass through the score marks and into the fibrous interior of the base sheet 11, with the result that portions of plastic integral with the structural member sections are impregnated into the fibrous material of the base sheet in the vicinity of the score marks.

Thus, even though the injected plastic material is adhesively incompatible with the plastic coating 12 at the temperature of injection, it, nevertheless, will have a secure anchor 15 in the fibers of the base sheet so as to permit the parts to function as a unitary or integral structure. A polyethylene coating on a base sheet of paper may be utilized with a structural member section of polypropylene in accord with the invention.

The composite paneling structure herein described has utility by way of example in composite container structures such as those described in Patent 3,119,540, issued Jan. 28, 1964 to R. F. Schenk et al.

The invention has been illustrated in connection with preferred embodiments thereof but other embodiments are included within its spirit. It is to be limited only by teh scope of the appended claims.

What is claimed is:
1. Composite paneling of flexible sheet material and marginal structural plastic member sections secured thereto comprising, a base sheet of fibrous material with a plastic layer coated thereon, score marks passing through the plastic layer and giving access to the fibrous interior of the base sheet, and a thermoplastic structural member section injection molded into bonding relationship with said base sheet along marginal edges thereof, said bonding being effected by integral portions of said thermoplastic material passing through said score marks and impregnating the fibrous material of the base sheet in the vicinity of said score marks.

2. Composite paneling according to claim 1 wherein the thermoplastic of the injection molded structural member section is adhesively incompatible with the plastic coating of the base sheet.

References Cited

UNITED STATES PATENTS 2,184,970  12/1939  Allen _____ 161—149 XR

ROBERT F. BURNETT, *Primary Examiner.*

W. POWELL, *Assistant Examiner.*

U.S. Cl. X.R.

156—257, 268, 293; 264—274; 161—114, 149